(12) United States Patent
Colmenarez et al.

(10) Patent No.: US 6,498,970 B2
(45) Date of Patent: Dec. 24, 2002

(54) AUTOMATIC ACCESS TO AN AUTOMOBILE VIA BIOMETRICS

(75) Inventors: Antonio Colmenarez, Peekskill, NY (US); Srinivas Gutta, Buchanan, NY (US); Miroslav Trajkovic, Ossining, NY (US)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/836,680

(22) Filed: Apr. 17, 2001

(65) Prior Publication Data

US 2002/0152010 A1 Oct. 17, 2002

(51) Int. Cl.[7] .............................. H04B 1/00; H04Q 1/00; G01L 5/00
(52) U.S. Cl. .......................... 701/36; 704/273; 382/116
(58) Field of Search .......................... 701/36; 704/273, 704/246, 270, 274, 275, 231; 382/116, 118; 340/426, 5.54, 5.8, 5.84, 5.52, 5.53, 5.72; 307/10.2; 180/287, 289

(56) References Cited

U.S. PATENT DOCUMENTS

| | | | |
|---|---|---|---|
| 4,449,189 A | * 5/1984 | Feix et al. | 364/513.5 |
| 4,856,072 A | * 8/1989 | Schneider et al. | 381/86 |
| 5,561,718 A | 10/1996 | Trew et al. | |
| 5,812,067 A | * 9/1998 | Bergholz et al. | 340/825.31 |
| 6,072,402 A | * 6/2000 | Kniffin et al. | 340/825.31 |
| 6,144,293 A | * 11/2000 | Plaschko et al. | 340/426 |
| 6,181,343 B1 | 1/2001 | Lyons | |
| 6,219,639 B1 | * 4/2001 | Bakis et al. | 704/246 |
| 6,219,640 B1 | * 4/2001 | Basu et al. | 704/246 |
| 6,243,683 B1 | * 6/2001 | Peters | 704/273 |

FOREIGN PATENT DOCUMENTS

| | | | |
|---|---|---|---|
| DE | 4027491 A1 | 3/1992 | ............ G07C/9/00 |
| DE | 19738321 | 3/1999 | ............ B60R/25/00 |
| DE | 19838421 | 3/2000 | ............ G07C/9/00 |
| EP | 0 924 123 A2 | 6/1999 | ............ B60R/25/00 |
| EP | 0 871 330 A1 | 1/2000 | ............ G08C/17/00 |
| JP | 11043016 | 2/1999 | ............ B60R/25/00 |
| JP | 2000-047691 | 2/2000 | ............ G10L/15/28 |
| WO | 9835118 | 8/1998 | ............ E05B/49/00 |

OTHER PUBLICATIONS

Campell, "Biometric Consortium: testing with the TOHO CD–ROM Voice Verification Corpus" U. S. Department of Defense, R2, Fort Meade, Maryland.

Matthews et al., "Lipreading Using Shape, Shading and Scale", Schoolk of Information Systems, University of East Anglia, Norwich NR4 7TJ, Department of Medical Biophysics, University of Manchester, Manchester M13 9PT.

Freeman et al., "Television control by hand gestures", Mitsubishi Electric Research Labs, IEEE Intl. Wkshp. On Automatic Face and Gesture Recognition, Zurich, Jun. 1995.

* cited by examiner

Primary Examiner—Tan Q. Nguyen
Assistant Examiner—Dalena Tran
(74) Attorney, Agent, or Firm—John Vodopia

(57) ABSTRACT

A system and method for identifying persons who are authorized to activate one or more vehicle mechanisms uses both an implicit identification of a face and an explicit identification of speech or a gesture. This system and method enables identification to be performed where a single identification is otherwise unable to perform the identification for some reason and improves the reliability and accuracy of an identification so that only authorized persons can activate the vehicle mechanisms. Vehicle mechanisms that can be activated using this multimodal identification system and method include, for example, automatic locks, automatic windows, a trunk lock, a vehicle engine, outdoor or interior lights, and a vehicle alarm.

23 Claims, 4 Drawing Sheets

000
AUTOMATIC ACCESS TO AN AUTOMOBILE VIA BIOMETRICS

BACKGROUND OF THE INVENTION

1. Field of the Invention

The present invention relates to a system and method for providing automatic access to a vehicle and for activating other vehicle mechanisms using biometrics.

2. Description of the Related Art

An automobile or other vehicle has various mechanisms that can be automatically activated. An existing remote control device attached to a key ring, for example, allows one to remotely lock and unlock automatic door and trunk locks and to automatically turn on the engine. As another example, a keypad mounted to the outside of a car door can be used to enter a password and thereby lock and unlock doors. Neither a remote control device or a keypad, however, is especially secure since a remote control device can be stolen as can the passcode to be entered on a keypad. It is desirable to provide a smart controller in a motor vehicle, enabling an intelligent vehicle providing a system and method for providing automatic access to a vehicle that is more secure, easy to use, and that cannot be misappropriated.

Some prior-art solutions activate vehicle functions, such as unlocking of doors, in response to biometrically identifying an authorized user near the vehicle. This, however, has the disadvantage that the user may only have intended to pass by his car at that time, and may not have wanted it to be unlocked. It is thus desirable to provide a smart controller in a motor vehicle which biometrically identifies authorized users and then performs vehicle actions only in response to some further user indication.

SUMMARY OF THE INVENTION

It is an object of the present invention to provide a system and method for activating automatic vehicle mechanisms, including the providing of automatic access to a vehicle, using a face identification.

It is a further object of the invention to provide a second means, in addition to the biometrics, for activating the automatic vehicle mechanisms, wherein the second means can be used to indicate which vehicle mechanism is to be activated and in what way it is to be activated and/or to provide a second layer of identification to confirm a face identification.

In accordance with the invention, a system and method is provided for activating a vehicle mechanism using biometrics. When an image of a face, having a set of unique biometric features, is captured in a field of view of a camera mounted to the vehicle, the set of unique biometric features of the captured image are compared to biometric information for a plurality of persons authorized to activate a vehicle mechanism to implicitly identify whether the detected face belongs to a person who is authorized to activate the vehicle mechanism. The vehicle mechanism is activated only if the implicit identification determines that the face belongs to one of the plurality of persons authorized to activate the vehicle mechanism. The system and method may further comprise, after implicitly identifying the face as belonging to one of the plurality of persons authorized to activate the vehicle mechanism and before activating the vehicle mechanism, detecting an explicit command comprising one of speech uttered by the implicitly identified authorized person and a gesture made by the implicitly identified authorized person, and comparing the detected explicit command to a set of explicit commands predefined by the implicitly identified authorized person to determine which vehicle mechanism to activate and how to activate it, if the vehicle mechanism is to be operated in multiple modes. The combination of implicit and explicit actions is a form of a "multimodal" vehicle control.

The vehicle mechanism to be activated may be, for example, a vehicle lock that can be automatically controlled to move between an open position and a closed position, a motor that can be automatically adjusted to an "on" position and an "off" position, vehicle lights that can be automatically adjusted to an "on" position and an "off" position, or a vehicle alarm that can be automatically activated and deactivated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1A:
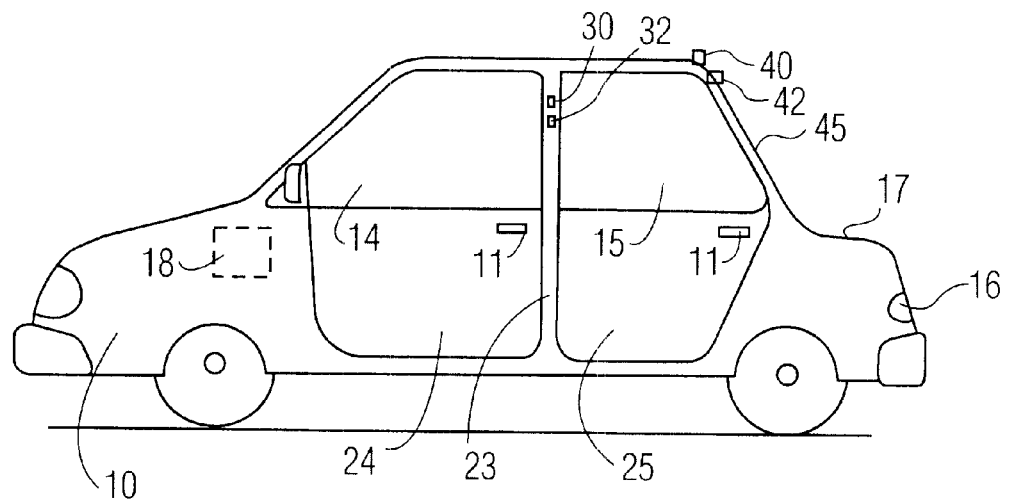
FIG. 1A is a side view of an automobile along the driver's side and shows the placement of various hardware, including cameras and microphones, in accordance with one embodiment of the invention.

Referring to FIG. 1A, the present invention is implemented on a vehicle 10. In the illustrated example, vehicle 10 is an automobile, although vehicle 10 may be any type of vehicle, such as a truck, van, a bus, or a construction vehicle. Vehicle 10 is equipped with various automated mechanisms like actuators for locks 11, windows 14, 15, and a trunk lock/latch 16 that can unlock a trunk lid 17, and an electronic ignition switch 18 in addition to the various other well-known mechanisms that are necessary to operate a vehicle. Other examples of vehicle mechanisms that can be activated by the present invention include outdoor or interior lights that can be turned on or off, a mechanism that can open a door, and a vehicle alarm that can be activated and deactivated.

Figure 1B:
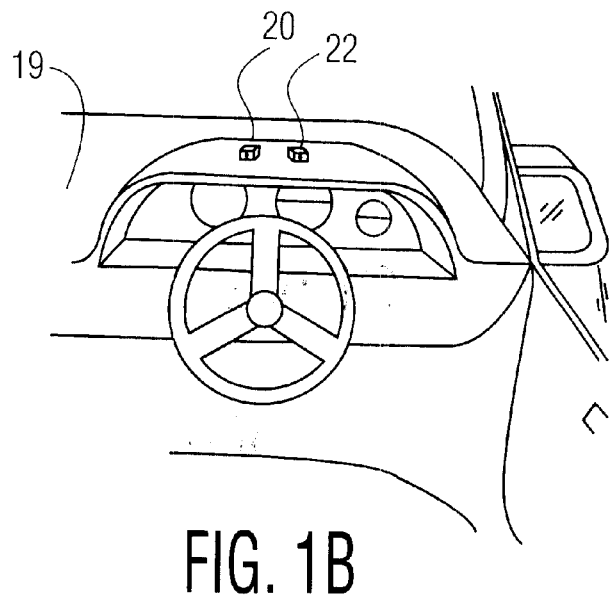
FIG. 1B is a perspective view of a vehicle dashboard with a camera and microphone mounted thereto in accordance with the embodiment of FIG. 1.

The vehicle 10 has components that are incorporated into one or more places on the vehicle in order to provide computer vision for identifying a user and activating a vehicle mechanism. As used herein, "computer vision" is the use of a computer to interpret information received from a video imaging device, viz. what the video imaging device sees. In the illustrated embodiment, these components include a first digital video camera 20 mounted internally on the dashboard 19, shown in FIG. 1B, with the lens facing substantially toward a driver who will sit behind the steering wheel on the front seat of the vehicle. Camera 20 may be, but need not be, a stereo camera. A stereo camera enables the use of methods which result in more comprehensive detection of point distances, which may improve the detection capabilities as compared to the detection capabilities with a single-lens camera. Camera 20 should be positioned so that the field of view of camera 20 spans an angle large enough for capturing the driver's facial biometric features and hand gestures for use in accordance with the invention to provide additional identification information. A microphone 22 may be mounted next to or within the same box as camera 20 to listen for voice commands.

A second digital video camera 30 may be mounted to the exterior of vehicle 10 toward the top of a pillar 23 between front and rear doors 24, 25 on a left side of vehicle 10. This camera 30 has a field of view spanning angle large enough for scanning biometric features of the face and hand gestures off drivers who are standing adjacent doors 24, 25 outside vehicle 10. A second microphone 32 may be mounted adjacent camera 30 to receive voice commands. A third digital video camera 40 may be mounted to the exterior of vehicle 10 toward the top of or above rear window 45. Camera 40 has a field of view spanning angle large enough for scanning the biometric features of the face and hand gestures of drivers who are standing within the field of view behind vehicle 10. Although it is preferred to use all three cameras 20, 30, 40 and all three microphones 22, 32, 42, one or two of each may be omitted.

Figure 2:
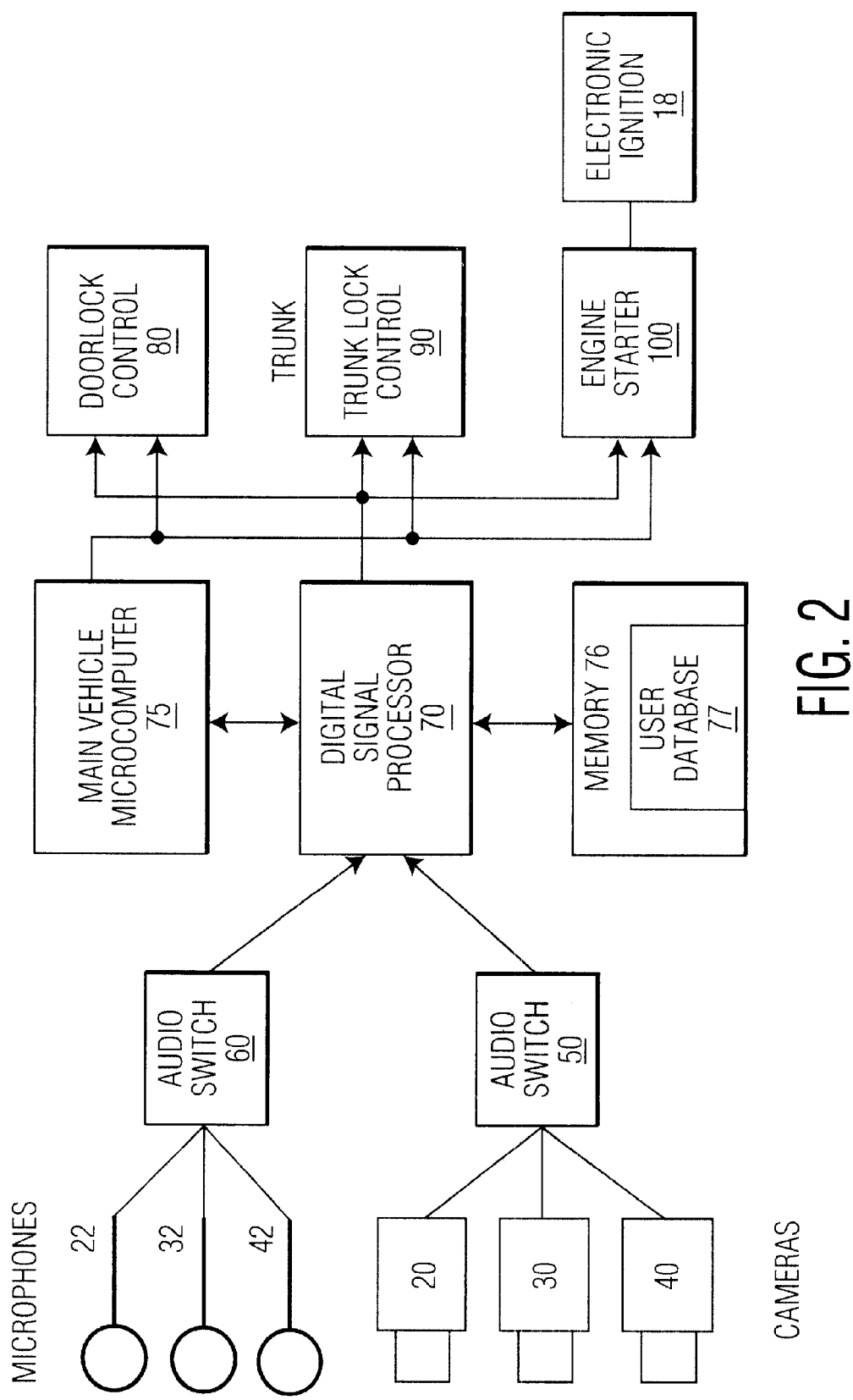
FIG. 2 is a block diagram depicting the system architecture for controlling the vehicle mechanisms in accordance with the embodiment of FIG. 1.

As shown in FIG. 2, cameras 20, 30, 40 are used to detect video signals. A video switch 50 linked to the cameras 20, 30, 40 sequentially polls each camera for a fraction of a second to determine whether a face is present within the field of view of any of the cameras, and, if so, the facial expressions, lip movement and other significant biometric features. A detected video signal is transmitted from the respective cameras 20, 30, 40 and input to a processor 70. Similarly, microphones 22, 32, 42 are used to detect audio signals. An audio switch 60 linked to the microphones 22, 32, 42 sequentially polls each microphone for a fraction of a second to determine whether a person is speaking at any of the microphones. A detected audio signal is transmitted from the respective microphones 22, 32, 42 and input to audio switch 60, which transmits the signal to processor 70 for speaker identification and/or speech recognition.

Alternatively, the cameras 20, 30, 40 and the microphones 22, 32, 42 may be activated only when a switch or other input device is activated, such as when a button is pressed, a key is inserted into a lock, or a wireless remote control device is activated. To enable use of the cameras 20, 30, 40 when the ambient light is insufficient for the cameras to detect an image, such as at night or when the vehicle is parked on a dimly lit street or in a dimly lit garage, lights may the mounted near the cameras 20, 30, 40 to illuminate the face of the person attempting to access the vehicle.

Processor 70 is a digital signal processor (DSP) dedicated to the tasks of performing face identification and identification of speech and gestures. Processor 70 interfaces with a memory 76 on which is stored a user database 77 containing a database of biometric data for persons who are authorized to operate the vehicle and, optionally, user-specific spoken utterances and gestures. The vehicle mechanisms whose activation can be controlled by processor 70 include, for example, actuators for door locks 80, a trunk lock 90, and an engine starter 100. Processor 70 also interfaces with a main vehicle microcomputer 75 that controls the functioning of all major computer-controlled vehicle systems and components, such as the vehicle's engine, transmission, etc., and may also control mechanisms 80, 90, 100 which may be directly linked to processor 70, as shown, or may be directly linked to main vehicle computer 75. Processor 70 should be capable of performing biometric and speech recognition in a relatively brief time so that the mechanisms are activated as quickly as possible to minimize inconvenience and maximize safety.

In order to be able to recognize persons, the user database 77 of persons who are authorized to use the vehicle is created through an enrollment process, which is supervised by a master user who has rights to authorize others to enroll. The master user may initially be, for example, a car dealer's sales representative, and is thereafter preferably changed to the purchaser(s) of the vehicle. The enrollment process involves compiling biometric information about each authorized person and saving the information in user database 77. The biometric information that should be compiled includes information about any biometric features that are to be used in face recognition, including facial features like facial appearance and possibly including facial expressions. Where speech and/or gestures are also to be recognized, the authorized user trains the system during the enrollment process to recognize his speech either in general for identification purposes or at least certain spoken utterances corresponding to particular voice commands, and/or to recognize gestures he will use to command that a particular vehicle mechanism be activated in a particular way. For example, where vehicle 10 is a family vehicle, user database 77 will likely comprise a database of family members using the vehicle.

Once the training for a particular person is complete, the face of a person who enters the field of view of one of the cameras 20, 30, 40 will be detected and an identification, sufficient to determine if the person is an authorized user, made. If a further user action, confirming that the user wishes a vehicle action to be performed is detected, the corresponding action is performed. The further user action may be an explicit action such as a predefined spoken utterance detected by microphones 22, 32, 42 and/or a predefined hand gesture sensed by cameras 20, 30, 40. Thus, the prior-art drawback of activating a vehicle mechanism (such as unlocking a door) merely because an authorized user has walked past the car is avoided. The gesture can serve as a command to indicate what mechanism to activate and how to activate it. For example, a person standing at the driver's door might opt to say "open the door" or "open the trunk". Additionally, voice recognition may be applied to this utterance to confirm or remand the video identification already made.

Figure 3:
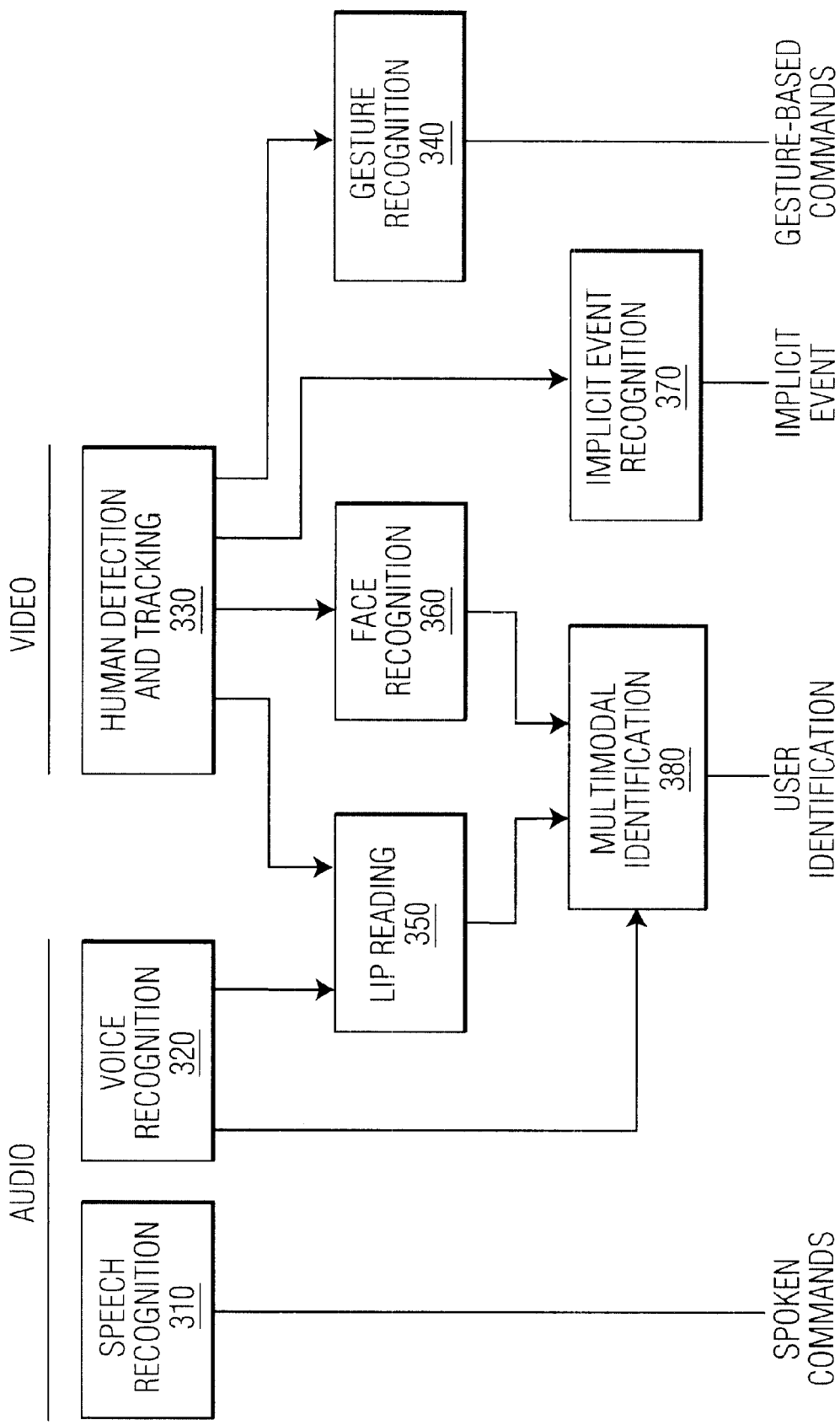
FIG. 3 depicts functions performed in a processor according to the present invention.

FIG. 3 is block diagram of the functions performed in DSP 70. Audio signals from the microphones are input to Speech Recognition 310 and Voice Recognition 320. Speech Recognition 310 determines the semantic sense of what the user is uttering, while Voice Recognition 320 identifies the user according to characteristics of his voice without regard to the content of what he is uttering. Speech Recognition is known in the art, for example in the widely-available programs ViaVoice® from IBM Corporation, NaturallySpeaking® from Dragon Systems, and SpeechPro® and SpeechMagic® from Philips Corporation. Voice Recognition (also known as speech identification) is widely known. See, for example, *Features and Measures for Speaker Recognition,* J. P. Campbell, Jr., Ph.D. dissertation, Oklahoma State University, 1992.

Video signals from the camera are input to Human Detection and Tracking 330, which accomplishes its function by means known in the art. See, for example, *Introductory Techniques for 3-D Computer Vision,* Emanuele Truco and Alessandro Verri, Prentice Hall, 1999, particularly at Chapter 7, *Stereopsis,* which provides methods for determining the locations of points in a pair of stereo images. Extrapolating from the determination of locations of a collection of points to a determination of the location of a human being who includes those points is expostulated in, for example, *Pedestrian Detection from a Moving Vehicle,* D. M. Gavrila, Daimler-Chrysler Research, Ulm, Germany, and in *Pfinder: Real-Time Tracking of the Human Body,* C. Wren et al, MIT Media Laboratory, published in IEEE Transactions on Pattern Analysis and Machine Intelligence, July 1997, vol. 19., no. 7, pp. 780–785.

Information regarding a detected and tracked human is forwarded to Face Recognition 360. A scheme for recognition of a human face is given, for example, in U.S. Pat. No. 5,561,718, Oct. 1, 1996 to Trew et al, incorporated herein by reference. In an optional embodiment of the invention, information regarding a detected and tracked human is also forwarded to LipReading 350, and audio from Voice Recognition 320 is also forwarded to LipReading 350. LipReading, more formally known as visual speech recognition, is known in the art. See, for example, *Lipreading Using Shape, Shading and Scale,* Iain Matthew et al, School of Information Systems, University of East Anglia, Norwich, U.K. LipReading 350 checks for a correspondence between the utterances received by the microphones and the oral movements received by the cameras. This could detect, for example, an impostor attempting to enter a vehicle using as a mask a full-size photograph of a rightful user.

Information on a recognized face from Face Recognition 360, information on a recognized voice from Voice Recognition 320, and information derived from lipreading from LipReading 350 (if used) are input to Multimodal Identification 380. Techniques for Multimodal Identification are given in U.S. patent application Ser. No. 09/718,255, filed on Nov. 22, 2000, assigned to common assignee herewith, titled *Candidate Level Multi-Modal Integration System,* incorporated herein by reference. If the user "seen" and "heard" is one of the rightful users whose characteristics are entered in user database 77, MultiModal Identification 380 indicates successful authorization of the user seen and heard.

Speech Recognition 310 identifies commands spoken by the user from a predetermined repertoire of commands, and outputs information indicating which command has been spoken. Information from Human Detection and Tracking 330 is also input to Gesture Recognition 340. Methods for computer interpretation of gestures are given in *Television Control by Hand Gestures,* W. T. Freeman & C. D. Weissman, Mitsubishi Electric Research Labs, IEEE International Workshop on Automatic Face and Gesture Recognition, Zurich, June, 1995, and in U.S. Pat. No. 6,181,343, *System and Method for Permitting Three-Dimensional Navigation through a Virtual Reality Environment Using Camera-Based Gesture Inputs,* Jan. 30, 2001 to Lyons. Gestures from a predetermined repertoire are detected, and information indicating a detected gesture is output from Gesture Recognition 340.

Information from Human Detection and Tracking 330 is further interpreted in Implicit Event Recognition 330 to detect implicit events, such as that the user is carrying packages which might result in opening the trunk or asking the user whether to open the trunk.

According to the present invention, a user must not only be recognized but must also perform some action in order to have a vehicle action performed. As a design choice, the action may something as simple as coming up to the driver's door and standing still for a predetermined time. As simple as this action is, it precludes the prior-art drawback of taking an action as soon as the user is recognized, which might occur when the user is merely passing by the vehicle. As a further design choice, other actions may be required. For example, the user may be required to say vocally "open the door", or "open the trunk". Implicit actions may also be factored into the determination to take an action. For example, if a user with arms full of packages comes up to the trunk and stands still momentarily, the trunk could open automatically. If the user with arms full of packages comes up to the driver's door and stands still momentarily, a speaker on the car might ask the voice-synthesized question "Shall I open the trunk?". If the user responds positively (as by saying "yes" or nodding affirmatively), the trunk might open; if the user responds negatively or not at all, the driver's door (where the user is standing) might open. Once a user authorized to drive the vehicle is sensed by camera 20 to be in the driver's seat he might say "Start the engine", and the engine would start.

Figure 4:
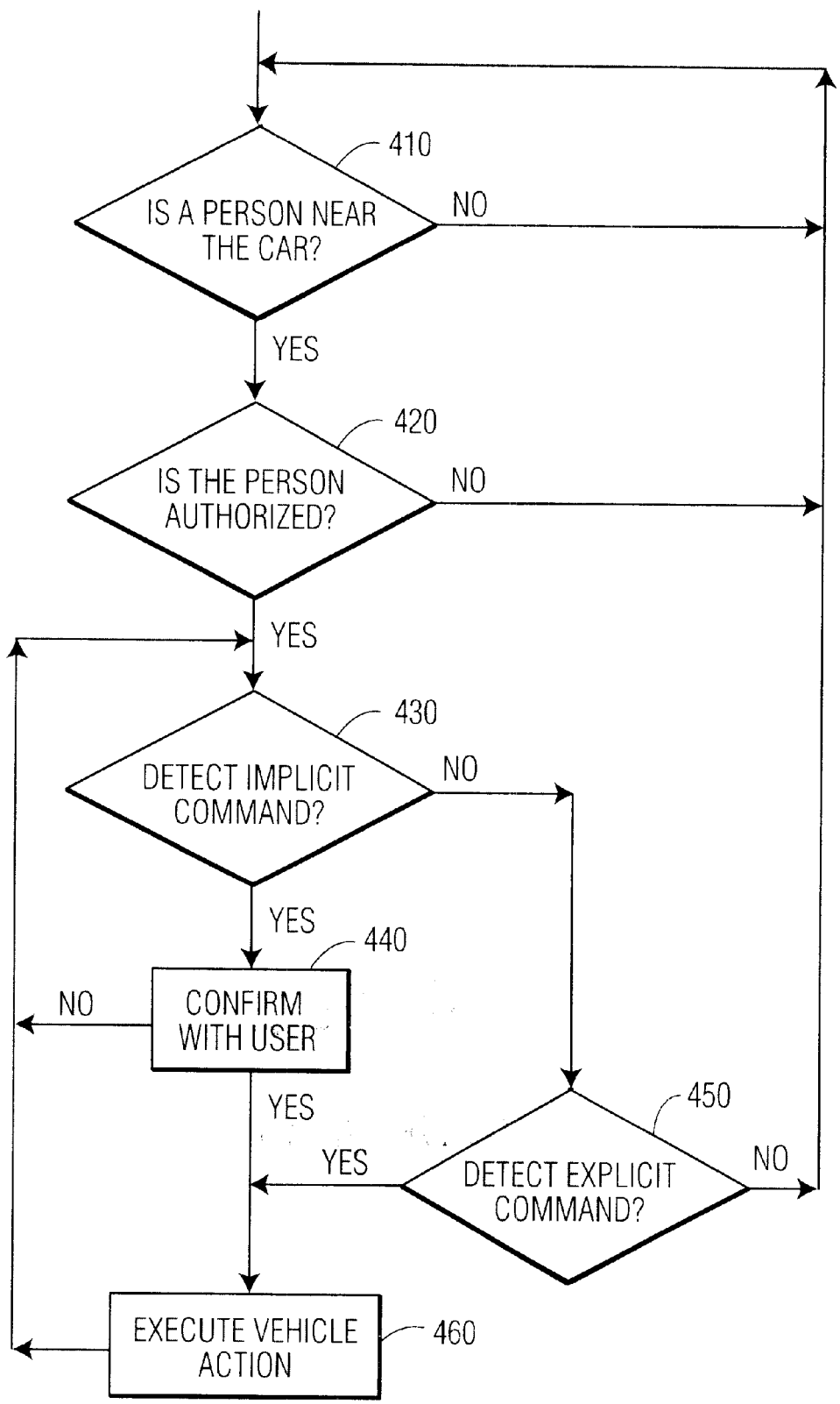
FIG. 4 depicts a flow chart of the steps for a multimodal control in accordance with the present invention to activate the vehicle mechanisms.

FIG. 4 is a flowchart of a process taking place in DSP 70 using the outputs of the function depicted in FIG. 3 to selectively admit a rightful user to an automobile and its features. Block 410 determines according to Human Detection and Tracking 330 whether a person is near the vehicle 10. If so, block 420 checks multimodal Identification 380 to determine whether that person is an authorized user. For an authorized user, block 430 determines according to Implicit Event Recognition 370 whether the person is giving implicit commands, in which case block 440 confirms with the user whether a corresponding action is to be taken. For example, if the user is carrying packages, a speech synthesizer (not shown) may ask "Shall I open the trunk". The trunk will then be opened in response to an affirmative utterance or gesture by the user detected in block 450. If the user is detected to be standing still at the driver's door, driver's doorlock control 80 can be actuated. Block 450 also responds to unsolicited commands given by the user as utterances or gestures, and in block 460 performs the corresponding action (e.g., "Start the engine").

In an alternative embodiment, the explicit command may be an explicit command other than speech or a gesture such as an alphanumeric code entered on a keypad, for example. An explicit command entered by keypad will provide a different layer of security for identification purposes than that provided by speech and gesture recognition since a keypad command can be more easily misappropriated.

Different actions may invoke different explicit commands in different contexts. Thus, for example, where interior camera 20 detects a "thumbs up" hand gesture, it may indicate that the engine should be started, whereas when the thumbs-up gesture is made in field of view of camera 40, the gesture indicates that the trunk should be opened. These differences can be stored in memory 76 and programmed to be recognized by processor 70.

Performing a multimodal identification will usually provide a more accurate and reliable result than using only a single means of identification, whether implicit or explicit. It resolves the shortcomings in using face identification by itself, one of which is that it may be difficult to distinguish between persons with very similar facial features, especially when a vehicle is not to be shared by family members who closely resemble one another. Another problem arises when face identification is to be performed at night and cameras 20, 30, 40 have difficulty discerning the facial features, even if a light is mounted near one or more of the cameras. The explicit identification supplements the face identification and enables the correct identification of only authorized persons.

One or more speakers and/or lights may be mounted inside or outside the vehicle to provide an alert when the identification method has been initiated and/or when it has been successful or unsuccessful. For example, a short sound of a buzzer may indicate that the person whose identification has been attempted is not authorized to activate any of the vehicle mechanisms.

There may also be different levels of access provided so that one person may be able to access some vehicle mechanisms and another person can activate other mechanisms. This can be defined in a look up table (LUT) in memory 76 that can be accessed by processor 70. For example, a vehicle owner's child who does not have a driver's license can be given access to open and close the door and trunk locks but can be denied access to start the engine.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A method for activating a vehicle mechanism, the method comprising:
    capturing with a detector a first indication comprising one of a facial feature of a person, an utterance by the person, and an action performed by the person;
    comparing at least one of the captured facial feature and the captured at least one of utterance and action to a database comprising at least one of facial features, utterances, and actions that are predefined by people who are authorized to activate a vehicle mechanism in order to determine whether the person is authorized to activate a vehicle mechanism;
    if the person is authorized to activate a vehicle mechanism, capturing a second indication comprising one of an utterance by the authorized person and an action by the authorized person for specifying the vehicle mechanism to be activated; and
    activating the specified vehicle mechanism.

2. The method of claim 1, wherein the detector comprises at least one of a camera and a microphone mounted to a vehicle, wherein the first indication comprises at least one of a facial feature captured in a field of view of a camera, a hand gesture captured in the field of view of the camera, and a voice command uttered by the person and captured by the microphone.

3. The method of claim 1, wherein the database comprises at least two of the facial features, utterances, and actions of the people who are authorized to activate the vehicle mechanism, wherein at least two of the facial features, utterances, and actions of the person are captured and compared to the database to determine whether the person is authorized to activate the vehicle mechanism.

4. The method of claim 1, wherein an utterance captured for specifying the vehicle mechanism to be activated is further used to corroborate the determination that the person is authorized to activate a vehicle mechanism.

5. The method of claim 4, wherein the corroboration is accomplished by at least lipreading techniques.

6. The method of claim 1, further comprising compiling the information for the database from the people who are authorized to activate the vehicle mechanism.

7. The method of claim 1, wherein the vehicle mechanism to be activated comprises at least one of the group of vehicle mechanisms consisting of a vehicle lock that can be moved between an open position and a closed position, an engine that can be set to an "on" and an "off" condition, vehicle lights that can be adjusted to an "on" condition and an "off" condition, and a vehicle alarm that can be activated and deactivated.

8. The method of claim 1, wherein the vehicle mechanism comprises an electronically operated door that can be opened and closed electronically, and wherein the step of activating the vehicle mechanism comprises causing the vehicle door to move between a closed position and an opened position electronically.

9. The method of claim 1, wherein the step of capturing a first indication is commenced upon activation of a switch.

10. The method of claim 1, wherein said step of capturing the second indication comprises capturing an utterance by an authorized person.

11. The method of claim 1, wherein said step of capturing the second indication comprises capturing an action by an authorized person.

12. An activation system for activating a vehicle mechanism, comprising:
    a vehicle mechanism on a vehicle;
    a detector mounted to the vehicle for capturing a first indication comprising at least one of a facial feature of the person, an utterance by the person, and an action performed by the person;
    a database comprising at least one of facial features, utterances, and actions that are predefined by people who arc authorized to activate a vehicle mechanism;
    means for comparing the captured at least one of the attribute, speech, and action to be performed to attributes, speech, and actions stored in the database;
    means for determining a vehicle mechanism to be activated from a second indication comprising a captured utterance or action by the person only if it is determined that the person is authorized to activate the vehicle by said means for comparing; and
    means for activating the determined vehicle mechanism only if it is determined that the person is authorized to activate the vehicle mechanism.

13. The activation system of claim 12, wherein the vehicle mechanism to be activated comprises at least one of the group of vehicle mechanisms consisting of a vehicle lock that can be moved between an open position and a closed position, a motor that can be adjusted to an "on" position and an "off" position, vehicle lights that can be adjusted to an "on" position and an "off" position, and a vehicle alarm that can be activated and deactivated.

14. The activation system of claim 12, wherein the vehicle mechanism to be activated comprises an electronically operated door on the vehicle that can be opened and closed electronically.

15. The activation system of claim 12, wherein the at least one detector comprises at least one of a camera and a microphone mounted to the vehicle, wherein the first indication comprises at least one of a facial feature captured in a field of view of a camera, a hand gesture captured in the field of view of the camera, and a voice command uttered by the person and captured by the microphone.

16. The activation system of claim 12, wherein the database comprises at least two of the facial features, utterances, and actions of the people who are authorized to activate the vehicle mechanism, wherein at least two of the facial features, utterances, and actions of the person are captured and compared to the facial features, utterances, and actions stored in the database to determine whether the person is authorized to activate the vehicle mechanism, and wherein the vehicle mechanism is activated only if the captured at least two of facial features, utterances, and actions of the person match at least two of the attributes, speech, and actions predefined as belonging to one of the people authorized to activate the vehicle mechanism.

17. The activation system of claim 12, wherein the second indication comprises an utterance captured for determining a vehicle mechanism to be activated and is further used to corroborate the determination that the person authorized to activate the vehicle mechanism.

18. The activation system of claim 17, wherein the corroboration is by at least lipreading techniques.

19. The activation system of claim 12, further comprising at least one additional camera, and a switch to poll the cameras until the captured at least one of a facial feature, utterance, and action is detected at a particular one of the cameras.

20. The activation system of claim 12, wherein the at least one detector comprises a plurality of microphones mounted to the vehicle for detecting the speech, and a switch to poll the plurality of microphones until an utterance is detected at a particular one of the plurality of microphones.

21. The activation system of claim 12, further comprising a switch which, when activated, commences the capturing of the at least one of a facial feature of the person, an utterance of the person, and an action performed by the person.

22. The activation system of claim 12, wherein said second indication comprises an utterance by the authorized person.

23. The activation system of claim 12, wherein said second indication comprises an utterance by the authorized person.

* * * * *